(12) United States Patent
Liang et al.

(10) Patent No.: US 11,176,143 B2
(45) Date of Patent: Nov. 16, 2021

(54) LOCATION-AWARE CONTENT DETECTION

(71) Applicant: Microsoft Corporation, Redmond, WA (US)

(72) Inventors: Bangyong Liang, Beijing (CN); Ju Liang, Beijing (CN); Jin Jiang, Beijing (CN); Xiaosong Yang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1062 days.

(21) Appl. No.: 14/507,763

(22) Filed: Oct. 6, 2014

(65) Prior Publication Data

US 2015/0026196 A1 Jan. 22, 2015

Related U.S. Application Data

(63) Continuation of application No. PCT/CN2012/083178, filed on Oct. 19, 2012.

(51) Int. Cl.
*G06F 16/2457* (2019.01)
*G06F 16/28* (2019.01)
(Continued)

(52) U.S. Cl.
CPC ...... *G06F 16/24578* (2019.01); *G06F 16/285* (2019.01); *H04L 67/1097* (2013.01);
(Continued)

(58) Field of Classification Search
CPC ........... G06F 17/3053; G06F 17/30598; H04L 67/1097; H04L 67/306; H04W 4/021; H04W 4/206
(Continued)

(56) References Cited

U.S. PATENT DOCUMENTS

| 5,930,474 A | 7/1999 | Dunworth et al. |
| 8,126,865 B1 | 2/2012 | Bharat et al. |

(Continued)

FOREIGN PATENT DOCUMENTS

| CN | 101477556 A | 7/2009 |
| CN | 102141986 A | 8/2011 |
| CN | 102611785 A | 7/2012 |

OTHER PUBLICATIONS

"First Office Action and Search Report Issued in Chinese Patent Application No. 201280002163.2", dated Apr. 26, 2016, 16 Pages.
(Continued)

*Primary Examiner* — Hosain T Alam
*Assistant Examiner* — Nicholas E Allen
(74) *Attorney, Agent, or Firm* — Medley, Behrens & Lewis, LLC

(57) ABSTRACT

Among other things, one or more techniques and/or systems are provided for location-aware content detection. In particular, content may be grouped into topic clusters (e.g., images, articles, and/or websites may be grouped into a football cluster, an earthquake cluster, etc.). A topic of a cluster may be assigned a global ranking (e.g., based upon an importance of a topic on a global scale) and/or local rankings for local regions (e.g., based upon importance of a topic to various local regions). A local ranking may be based upon user interaction with content associated with the topic (e.g., many users from Japan may be reading about the earthquake). In this way, content may be provided to users based upon global rankings and/or local rankings (e.g., content from around the world about the earthquake may be presented to users in Japan and/or other areas that have expressed interest in the earthquake).

20 Claims, 8 Drawing Sheets

(51) Int. Cl.
*H04W 4/021* (2018.01)
*H04L 29/08* (2006.01)
*H04W 4/21* (2018.01)

(52) U.S. Cl.
CPC .......... *H04L 67/306* (2013.01); *H04W 4/021* (2013.01); *H04W 4/21* (2018.02)

(58) Field of Classification Search
USPC ...................................................... 707/748
See application file for complete search history.

(56) References Cited

U.S. PATENT DOCUMENTS

| | | |
|---|---|---|
| 2006/0240856 A1 | 10/2006 | Counts et al. |
| 2007/0291299 A1 | 12/2007 | Gava et al. |
| 2009/0030899 A1 | 1/2009 | Tareen et al. |
| 2009/0049038 A1 | 2/2009 | Gross |
| 2009/0070346 A1 | 3/2009 | Savona et al. |
| 2010/0083124 A1* | 4/2010 | Druzgalski ......... G06F 17/3087 715/738 |
| 2011/0113047 A1 | 5/2011 | Guardalben |
| 2011/0302162 A1* | 12/2011 | Xiao ................. G06F 17/30867 707/724 |
| 2011/0320443 A1 | 12/2011 | Ray et al. |
| 2012/0131139 A1* | 5/2012 | Siripurapu .............. H04L 65/60 709/217 |
| 2012/0254074 A1* | 10/2012 | Flinn ....................... G06N 7/02 706/4 |
| 2012/0290518 A1* | 11/2012 | Flinn ..................... G06N 5/048 706/12 |
| 2013/0204876 A1* | 8/2013 | Szucs ............... G06F 17/30737 707/738 |
| 2013/0232263 A1* | 9/2013 | Kelly ..................... H04L 43/10 709/224 |
| 2013/0325858 A1* | 12/2013 | Xu .................... G06F 17/30699 707/730 |
| 2014/0019443 A1* | 1/2014 | Golshan ............ G06F 17/30867 707/723 |
| 2014/0074608 A1* | 3/2014 | Beck .................. G06Q 30/0273 705/14.54 |
| 2014/0089777 A1* | 3/2014 | Roiniotis ............... G06Q 50/01 715/234 |
| 2014/0278986 A1* | 9/2014 | Rouse ................ G06Q 30/0256 705/14.54 |

OTHER PUBLICATIONS

Liu, et al., "LocalSavvy: Aggregating Local Points of View about News Issues", Retrieved at <<http://infolab.northwestern.edu/media/papers/paper10168.pdf>>, Proceedings of the first international workshop on Location and the web, Apr. 21, 2008, pp. 8.

O'Brien, Heather L., "Exploring User Engagement in Online News Interactions", Retrieved at <<http://faculty.arts.ubc.ca/hobrien/files/OBrien_Exploring_User_Engagement_in_Online_News.pdf>>, In Proceedings of the Annual Meeting of the American Society of Information Science and Technology, Jan. 11, 2012, pp. 15.

International Search Report cited in PCT application No. PCT/CN2012/083178 dated Aug. 1, 2013, pp. 1-8.

"Second Office Action Issued in Chinese Patent Application No. 201280002163.2", dated Oct. 17, 2016, 12 Pages.

"Fourth Office Action and Search Report Issued in Chinese Patent Application No. 201280002163.2", dated Mar. 30, 2017, 14 Pages.

"Office Action Issued in Chinese Patent Application No. 201280002163.2", dated Dec. 12, 2016, 11 Pages.

"International Preliminary Report on Patentability Issued in PCT Application No. PCT/US2016/029407", dated Aug. 10, 2017, 7 Pages.

* cited by examiner

LOCATION-AWARE CONTENT DETECTION

BACKGROUND

Many users may discover and interact with content through various interfaces, such as a news application on a mobile device, a social media website, an image sharing application on a desktop device, etc. For example, users may interact with news articles, images, social media posts, videos, websites, blogs, music streams, and/or a wide variety of content. Content providers may utilize various techniques to identify content that may be relevant and/or interesting to users. In one example, a search engine may provide search results that are relevant to a search query submitted by a user. In another example, a social media service may provide friend suggestions to a user based upon relationships of the user to one or more other users. In this way, a user may efficiently locate content that may be interesting to the user.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for location-aware content detection are provided herein. That is, content (e.g., images, social media posts, videos, articles, websites, and/or a plethora of other information) may be selectively ranked based upon various factors, such as global rankings (e.g., importance/interest of content at a global level), local rankings (e.g., importance/interest of content to various local regions), and/or other factors. In this way, content may be ranked according to how interesting a particular region (e.g., a country, a state, a university, a city, a business industry, etc.) may find the content.

In one example, a set of content may be grouped into one or more content clusters. For example, content having similar features (e.g., image features, textual features, etc.) may be grouped into a content cluster. Because content within the content cluster may share similar features, a topic may be derived from the content cluster (e.g., a soccer topic may be derived from a content cluster comprising images, social network posts, articles, and/or other content relating to soccer). In this way, one or more topic clusters may be generated based upon topics identified from the content clusters. At least some content from the set of content may be grouped into the one or more topic clusters.

The topics of one or more topic clusters may be assigned global rankings that may indicate how important/interesting such topics may be at a global level. In one example, a topic of a topic cluster may be assigned a global rank based upon one or more features of content grouped into the topic cluster. For example, the global rank may be based upon a size feature (e.g., if a relatively large amount or number of content is grouped into a topic cluster, then the topic of the topic cluster may be relatively important), a freshness feature (e.g., if a relatively small amount of content has been generated within a particular time span, such as a week, then the topic may be stale), a source trust feature (e.g., a source trust list may comprise trust levels for content providers), a quality feature (e.g., quality, resolution, etc. of an image, length of an article, user review of content, etc.), and/or other features. In this way, global rankings may be assigned to respective topics of the one or more topic clusters.

The topics of the one or more topic clusters may be assigned local rankings for local regions that may indicate how important/interesting such topics may be to users of the local regions. In one example, a local ranking for a local region may be assigned to a topic based upon user engagement data and/or content occurrence data associated with the local region. The user engagement data may correspond to a number of user interactions, such as user views, user comments, social media posts, and/or user reviews, associated with content of the topic by users of the local region. The content occurrence data may correspond to an amount of content that originated from sources associated with the local region. In this way, topics may be assigned global rankings and/or local rankings for local regions. Content may be presented to a user of a particular local region based upon the content being associated with a topic having a relatively high global ranking and/or a relatively high local ranking for the local region of the user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
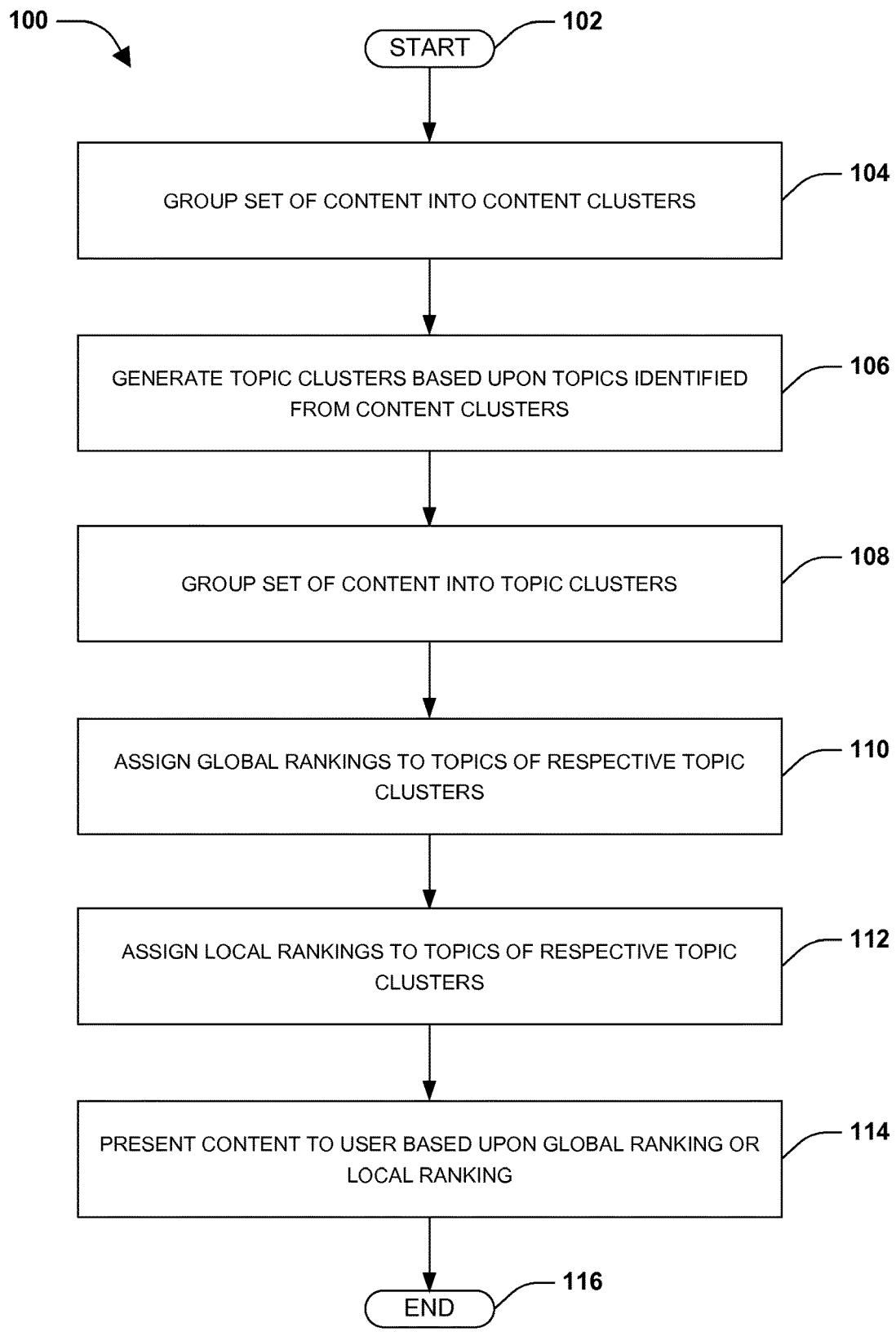
FIG. 1 is a flow diagram illustrating an exemplary method of location-aware content detection.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Because a wide variety of content may be available for users to consume through computing devices, it may be advantageous to selectively provide content to users that may be relevant and/or interesting. Accordingly, as provided herein, topics for content may be assigned global rankings and/or local rankings for local regions. Such rankings may be used to selectively provide content to users that may be interested in a topic of the content. For example, content associated with a topic that is assigned a relatively high local ranking for a particular country (e.g., based upon users of the country reading, commenting, and/or reviewing content associated with the topic) may be presented to users of the country. It may be appreciated that content may comprise a wide variety of content, such as social media posts, blogs, articles, text documents, images, videos, websites, search engine results, and/or a plethora of other types of information.

One embodiment of location-aware content detection is illustrated by an exemplary method 100 in FIG. 1. At 102, the method starts. At 104, a set of content may be grouped into one or more content clusters. For example, images, articles, web pages, and/or a variety of other content may be obtained from various content sources (e.g., websites, media sources, social networks, etc.). The set of content may be grouped into one or more content clusters. For example, a first set of content and a second set of content may be grouped into a first content cluster based upon the first set of content and the second set of content having similar features (e.g., news stories, social network posts, and/or videos associated with a soccer feature may be grouped together into a soccer content cluster). It may be appreciated that one example of a content cluster is illustrated in example 300 of FIG. 3 (e.g., content clusters 312).

At 106, one or more topic clusters may be generated based upon one or more topics identified from the content clusters. It may be appreciated that one example of a topic cluster is illustrated in example 300 of FIG. 3 (e.g., topic clusters 320). For example, a soccer topic may be derived from the content grouped into the soccer content cluster, such that a soccer topic cluster may be generated based upon the soccer topic. At 108, content may be grouped into at least some of the topic clusters (e.g., content associated with soccer may be grouped into the soccer topic cluster). In this way, topics and/or topic clusters may be dynamically defined based upon available content.

At 110, global rankings may be assigned to topics of respective topic clusters. It may be appreciated that one example of assigning global rankings is illustrated in example 400 of FIG. 4. A global ranking may be assigned to a topic based upon features (e.g., a size feature, a freshness feature, a source trust feature, a quality feature, etc.) associated with a topic cluster and/or content within the topic cluster. In one example of a size feature, a relatively high global ranking may be assigned to a world cup topic based upon a relatively large amount of content being grouped within a world cup topic cluster, whereas a relatively low global ranking may be assigned to a celebrity meltdown topic based upon a relatively small amount of content being grouped into a celebrity meltdown topic cluster. In one example of a freshness feature, a relatively low global ranking may be assigned to a civil war topic based upon a relatively small amount of content being recently made available for the civil war topic. In one example of a source trust feature, a relatively high global ranking may be assigned to a Japan earthquake topic based upon a provider (e.g., a media entity, a newspaper, etc.) of content associated with the Japan earthquake topic having a relatively high trust level. In one example of a global ranking, a U.S. golf open topic may be assigned a relatively high global ranking based upon content associated with the U.S. golf open topic having a relatively high quality (e.g., relatively high resolution images, relatively large textual descriptions, relatively high user reviews, etc.). In this way, global rankings (e.g., a metric associated with how important a topic may be on a global perspective) may be assigned to topics.

At 112, local rankings, for one or more local regions, may be assigned to topics of respective topic clusters based upon user engagement data and/or content occurrence data associated with local regions. It may be appreciated that one example of assigning local rankings is illustrated in example 500 of FIG. 5. In one example, a first local ranking for a first local region (e.g., a first university with a relatively strong football team) may be assigned to a football topic based upon user interaction, by students associated with the first university, with content of a football topic cluster (e.g., football articles, football images, football web searches, etc.). For example, the first university may be assigned a relatively high local ranking as the first local ranking (e.g., students associated with the first university may have relatively high user engagement with football content). In another example, a second local ranking for a second local region (e.g., a second university without a football team) may be assigned to the football topic based upon user interaction, by students associated with the second university, with content of the football topic cluster. For example, the second university may be assigned a relatively low local ranking as the second local ranking (e.g., students associated with the second university may have relatively low user engagement with football content). User interaction may correspond to a variety of user actions, such as viewing content, commenting on content, users reviewing content, users posting social media posts referencing content, users perform search queries for content, etc. In this way, user engagement may correspond to a number of user interactions with content within a particular time span, for example. In another example of local rankings, a local ranking may be assigned to a topic based upon content occurrence of the content within a local region. For example, if a relatively large amount of football content originated from sources associated with the first university, then a relatively high local ranking for the first university may be assigned to the football topic. In this way, topics may be ranked according to how interesting/important such topics may be to users of particular local regions.

At 114, content may be presented to a user based upon a global ranking for a topic associated with the content and/or a local ranking, associated with a local region of the user, for the topic. For example, a football topic may have a relatively medium global ranking and a relatively high local ranking for the first university. Accordingly, a user associated with the first university may be presented with content associated with the football topic (e.g., a news application and/or a news website may display football content from various locations to the user). It may be appreciated that one example of displaying content is illustrated in example 600 of FIG. 6. At 116, the method ends.

Figure 2:
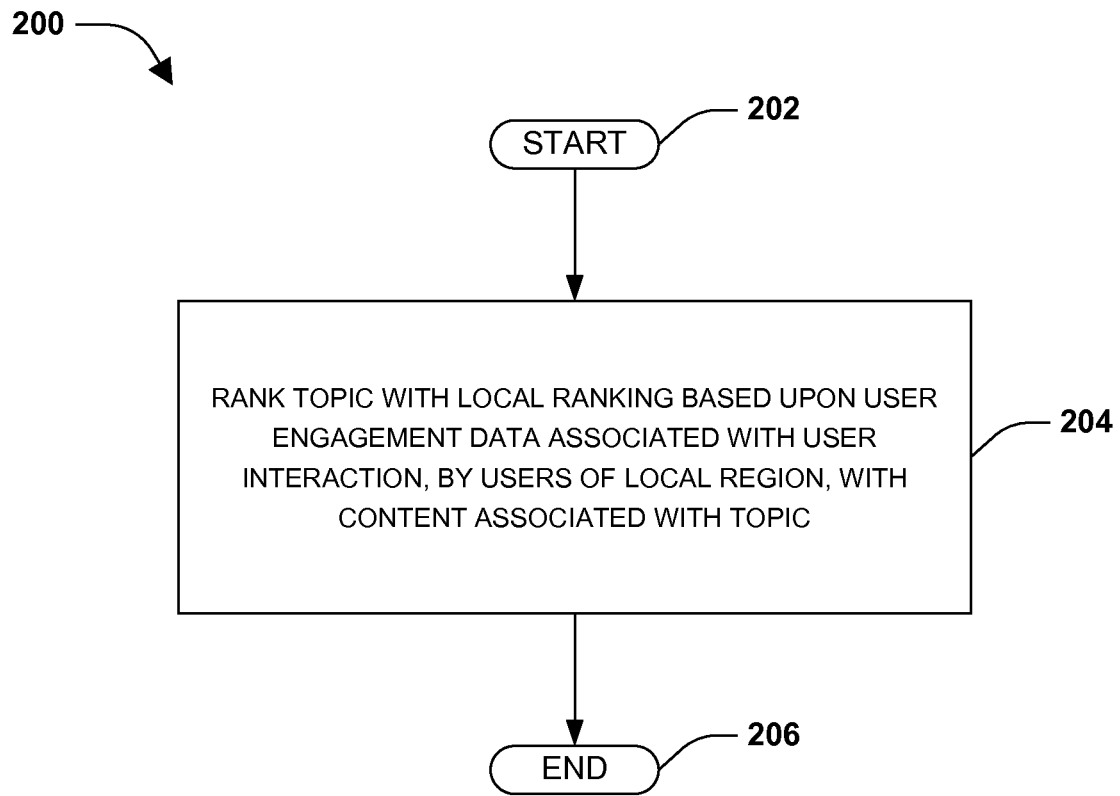
FIG. 2 is a flow diagram illustrating an exemplary method of location-aware content detection.

One embodiment of location-aware content detection is illustrated by an exemplary method 200 in FIG. 2. At 202, the method starts. At 204, a topic may be ranked with a local ranking based upon user engagement data associated with user interaction, by one or more users of a local region, with content associated with the topic. In one example, the topic (e.g., a football topic, a presidential debate topic, an oil spill topic, etc.) may correspond to content grouped into a topic cluster associated with the topic (e.g., oil spill articles within an oil spill topic cluster, football images within a football topic cluster, etc). Users from various local regions (e.g., different countries, cities, states, businesses, organizations, universities, etc.) may interact with such content. For example, students of a university with a strong football team may interact with a relatively large amount of football content compared with students of a university without a football team. Such user interaction may be collected as user engagement data, which may indicate how important and/or relevant the topic is to a particular local region. In this way, content associated with the topic may be presented to a user within the local region based upon the local ranking being above a local interest threshold (e.g., a local ranking of 9 for the football topic may be greater than a local interest threshold of 5). The content may originate from a source within the local region or outside of the local region (e.g., football associated with a different university, state, or country). In one example, the local ranking may be based upon a content occurrence associated with content occurring from the local region (e.g., the local ranking may be based upon the amount of content that was published by a provider located within the local region). In this way, one or more topics may be ranked and/or selectively presented to a user based upon location-based user engagement data and/or occurrence of content from particular regions. At 206, the method ends.

Figure 3:
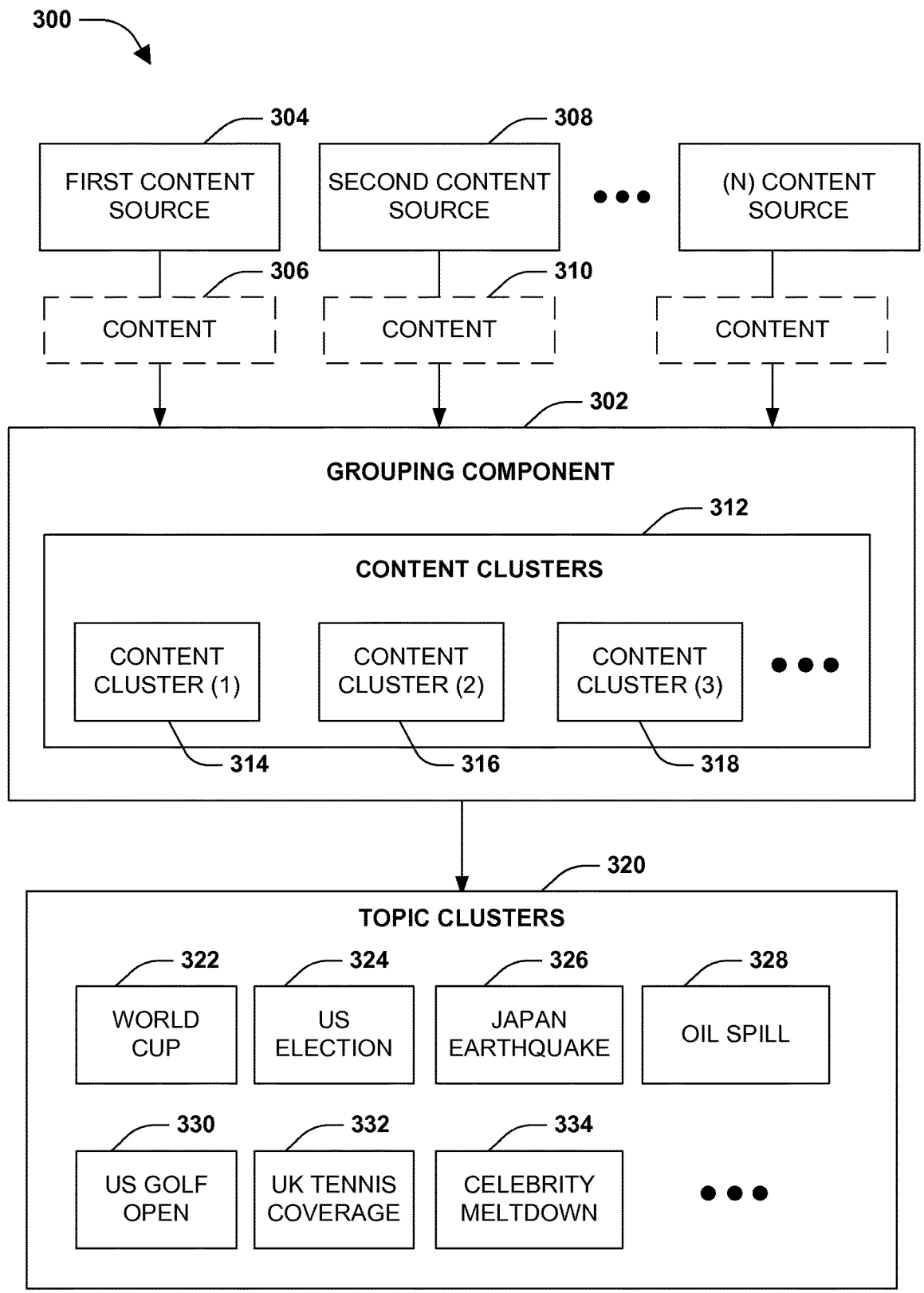
FIG. 3 is a component block diagram illustrating an exemplary system for generating topic clusters.

FIG. 3 illustrates an example of a system 300 configured for generating topic clusters 320. The system 300 may comprise a grouping component 302. The grouping component 302 may be configured to group content (e.g., content 306 from a first content source 304, content 310 from a second content source 308, etc.) into content clusters 312. For example, the grouping component 302 may create a first content cluster 314 comprising content having similar features (e.g., news articles, images, and/or videos having sports features), a second content cluster 316 having similar features (e.g., websites, text documents, and/or social media posts having political features), a third content cluster 318 having similar features (e.g., audio, micro blogs, and/or articles having celebrity features), and/or other content clusters not illustrated.

The grouping component 302 may be configured to generate the topic clusters 320 based upon one or more topics identified from the content clusters 312. For example, the grouping component 302 may create a world cup topic cluster 322, a U.S. election topic cluster 324, a Japan earthquake topic cluster 326, an oil spill topic cluster 328, a U.S. golf open topic cluster 330, a U.K. tennis coverage topic cluster 332, a celebrity meltdown topic cluster 334, and/or other topic clusters not illustrated. The grouping component 302 may be configured to group content into at least some of the topic clusters 320 (e.g., content associated with the oil spill may be grouped into the oil spill topic cluster 328). In this way, topics may be assigned to the topic clusters 320.

Figure 4:
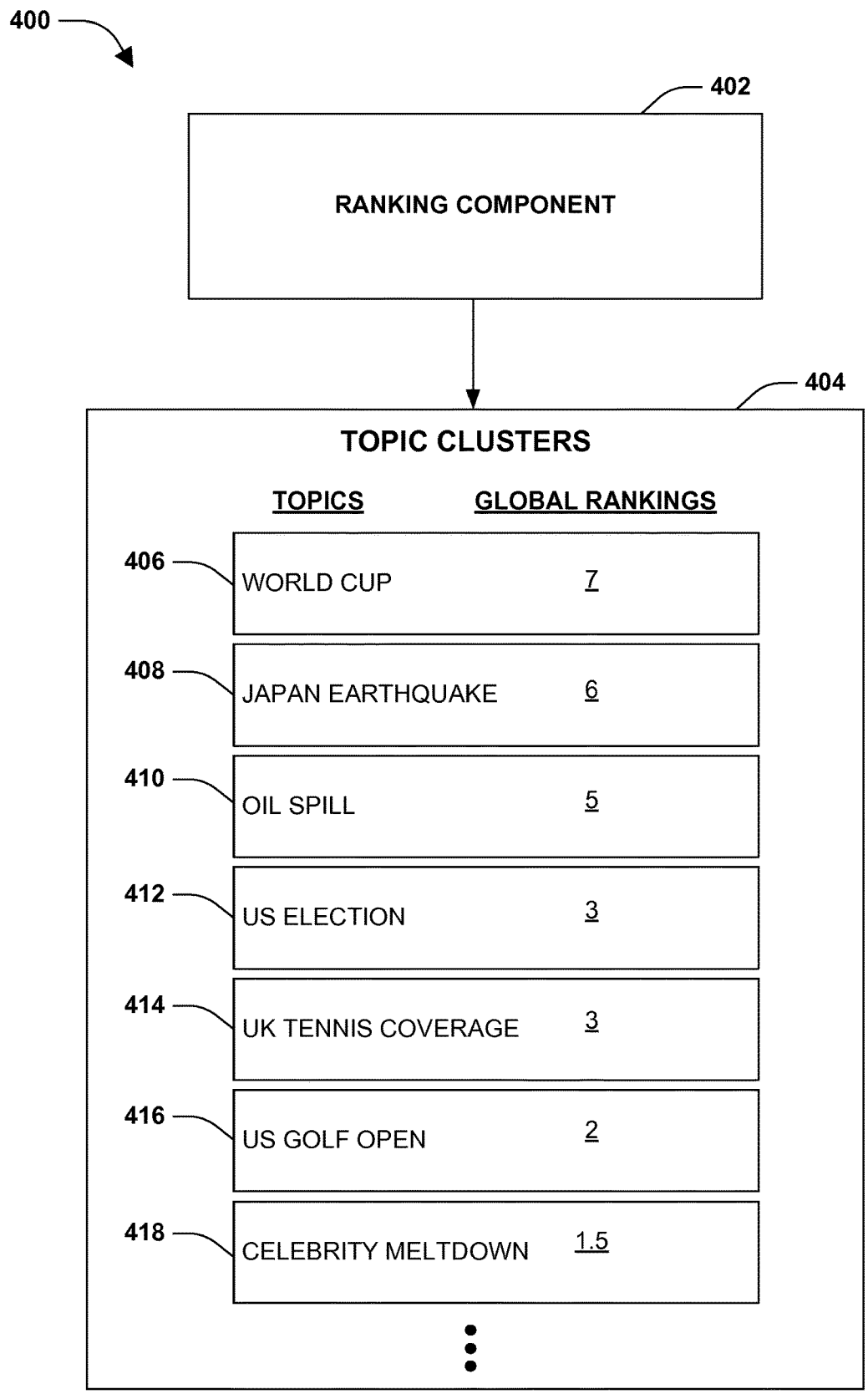
FIG. 4 is a component block diagram illustrating an exemplary system for assigning global rankings to topics of the topic clusters.

FIG. 4 illustrates an example of a system 400 configured for assigning global rankings to topics of the topic clusters 404. The system 400 may comprise a ranking component 402. The ranking component 402 may be configured to assign global rankings to respective topic clusters based upon features of content grouped into the topic clusters. The features may comprise size features (e.g., a size of a topic cluster), freshness features (e.g., how recently new content has been generated for a topic), a source trust feature (e.g., a trust level of a provider of content for the topic), a quality feature (e.g., an image or textual quality of content for the topic), and/or other features. For example, the ranking component 402 may assigned a global ranking of 7 to a world cup topic 406, a global ranking of 6 to a Japan earthquake topic 408, a global ranking of 5 to an oil spill topic 410, a global ranking of 3 to a U.S. election topic 412, a global ranking of 3 to a U.K. tennis coverage topic 414, a global ranking of 2 to a U.S. golf open topic 416, a global ranking of 1.5 to a celebrity meltdown topic 418, and/or other global rankings to topics not illustrated. In this way, a global ranking may correspond to an importance of a topic on global level (e.g., a world-wide importance, an importance to university, an importance to a particular age group, an importance to a particular business industry, and/or an importance to any other global grouping of entities, such as people, locations, or things, for example).

Figure 5:
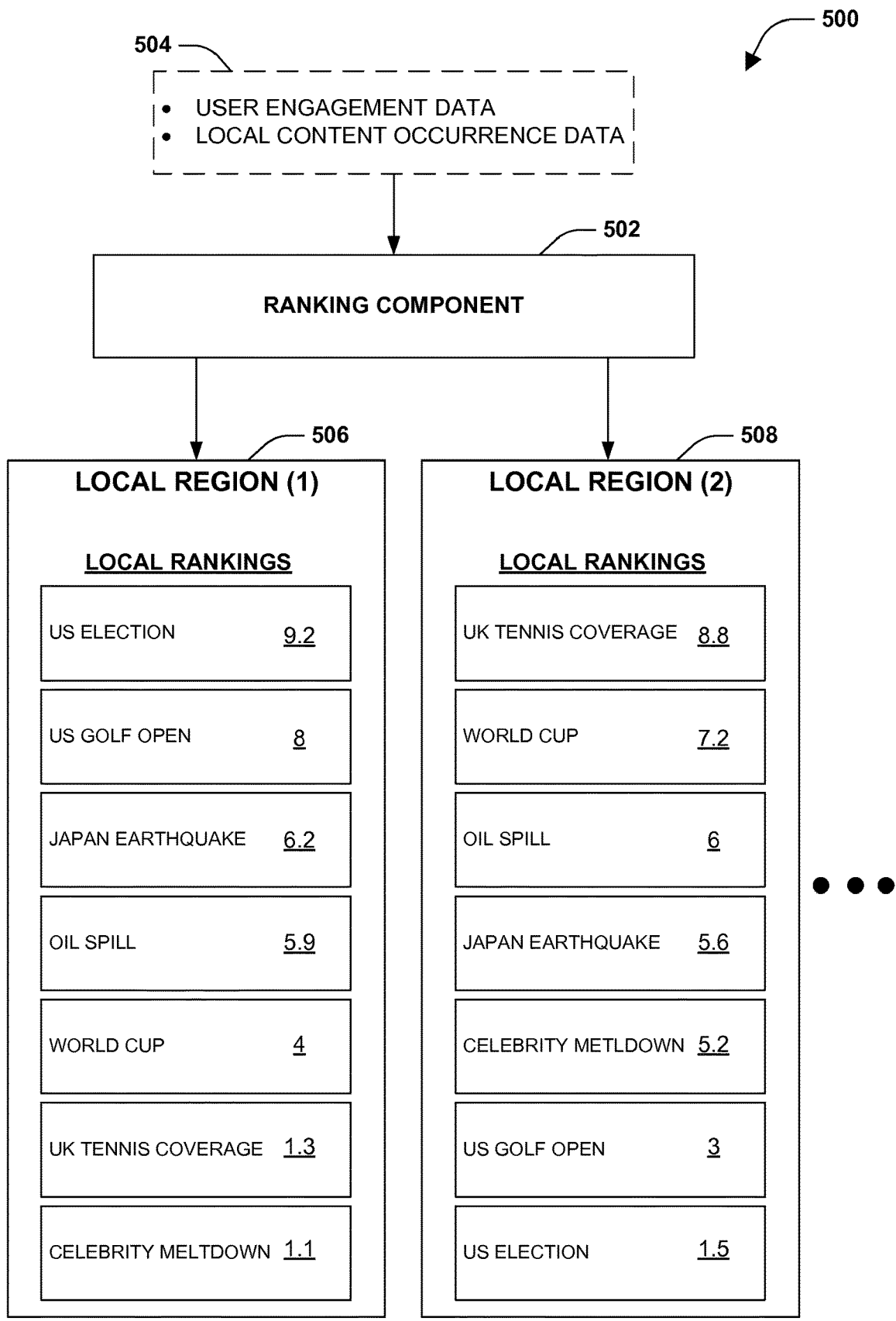
FIG. 5 is a component block diagram illustrating an exemplary system for assigning local rankings to topics.

FIG. 5 illustrates an example of a system 500 configured for assigning local rankings to topics. The system 500 may comprise a ranking component 502. The ranking component 502 may be configured to assign local rankings for local regions to topics based upon user engagement data and/or local content occurrence data (local content data 504). The user engagement data may correspond to user interaction, by users of a local region, with content associated with a topic. The local content occurrence data may correspond to an amount of content that was created by providers from the local region (e.g., a local newspaper website). In this way, the local rankings may correspond to how important and/or relevant topics are to users of particular local regions.

In one example, the ranking component 502 may assign local rankings for a first local region 506 (e.g., software companies located within a first geographical region) based upon user engagement data of users within the first local region (e.g., employee interaction with content associated with a topic) and/or local content occurrence data within the first local region (e.g., an amount of content generated by sources within the first geographical region). For example, the ranking component 502 may assign a local ranking of 9.2 to a U.S. election topic, a local ranking of 8 to a U.S. golf open topic, a local ranking of 6.2 to a Japan earthquake topic, a local ranking of 5.9 to an oil spill topic, a local ranking of 4 to a world cup topic, a local ranking of 1.3 to a U.K. tennis coverage topic, and/or a local ranking of 1.1 to a celebrity meltdown topic.

The ranking component 502 may assign local rankings for a second local region 508 (e.g., software companies located within a second geographical region) based upon user engagement data of users within the second local region and/or local content occurrence data within the second local region. In this way, the ranking component 502 may assign local rankings for local regions to topics, which may indicate how important and/or relative a topic is to a particular local region, for example.

Figure 6:
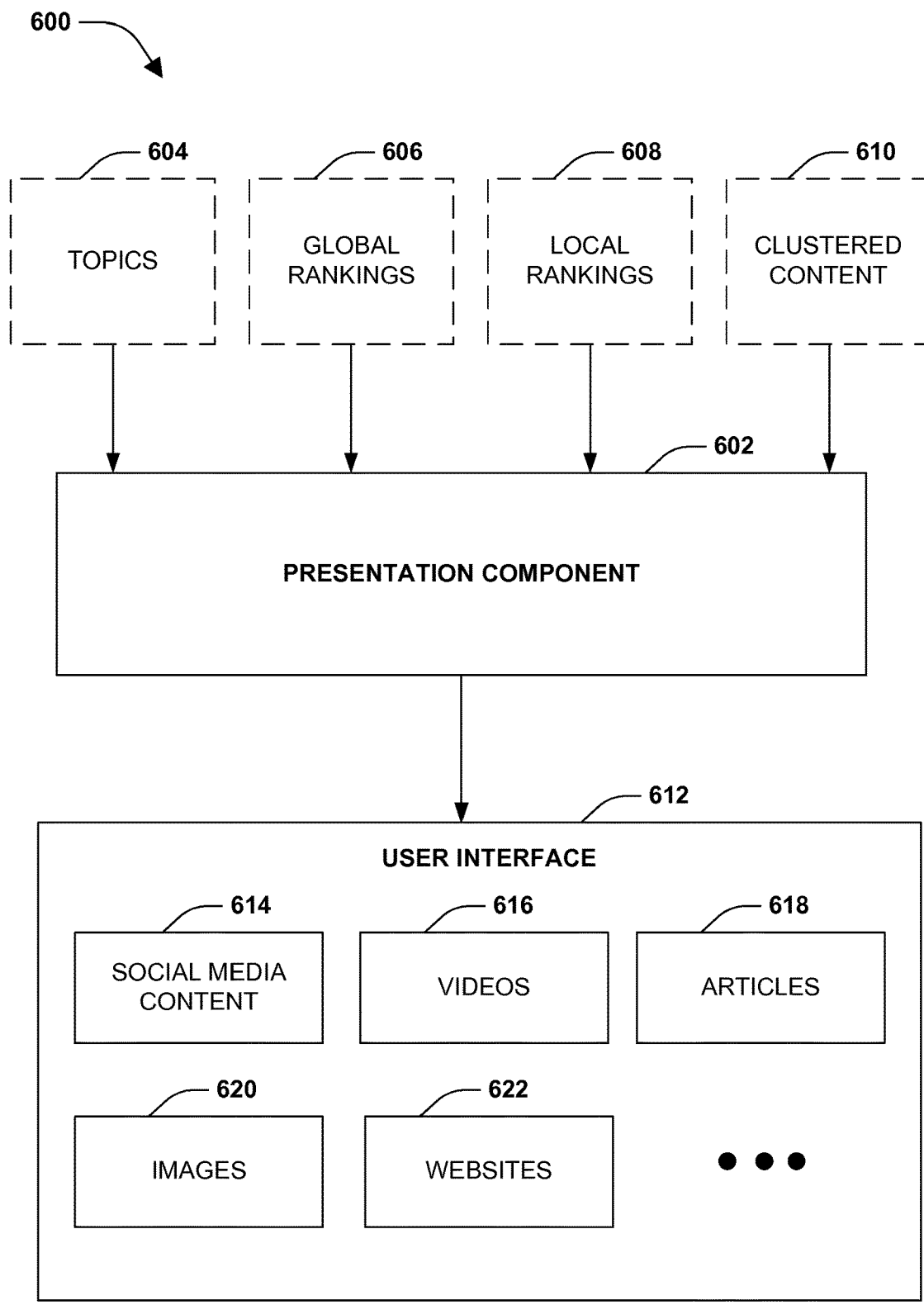
FIG. 6 is a component block diagram illustrating an exemplary system for presenting content to a user based upon location-aware topic detection.

FIG. 6 illustrates an example of a system 600 for presenting content to a user based upon location-aware topic detection. The system 600 may comprise a presentation component 602. The presentation component 602 may be configured to present content from a set of clustered content 610 through a user interface 612 (e.g., a mobile app, an application, a website, etc.). Content within the clustered content 610 may be associated with topics 604 (e.g., a first cluster of content may be associated with a football topic, a second cluster of content may be associated with a vacation topic, etc.). The presentation component 602 may selectively determine what content to present through the user interface 612 based upon global rankings 606 and/or local rankings 608 associated with the topics 604 of the clustered content 610.

In one example, the presentation component 602 may determine that a user of the user interface 612 is associated with a local region of Japan based upon a cookie setting, a user profile, an IP address, and/or other identifying information associated with the user. The presentation component 602 may identify content associated with topics having relatively high global rankings (e.g., content that may be important on a global basis) and/or relatively high local rankings for Japan (e.g., content that may be important to users in Japan as indicated by user engagement data of users in Japan). In this way, the presentation component 602 may display social media content 614, videos 616, articles 618, images 620, websites 622, and/or other content that may be important and/or relevant on a global basis and/or a local basis to Japan, for example.

Figure 7:
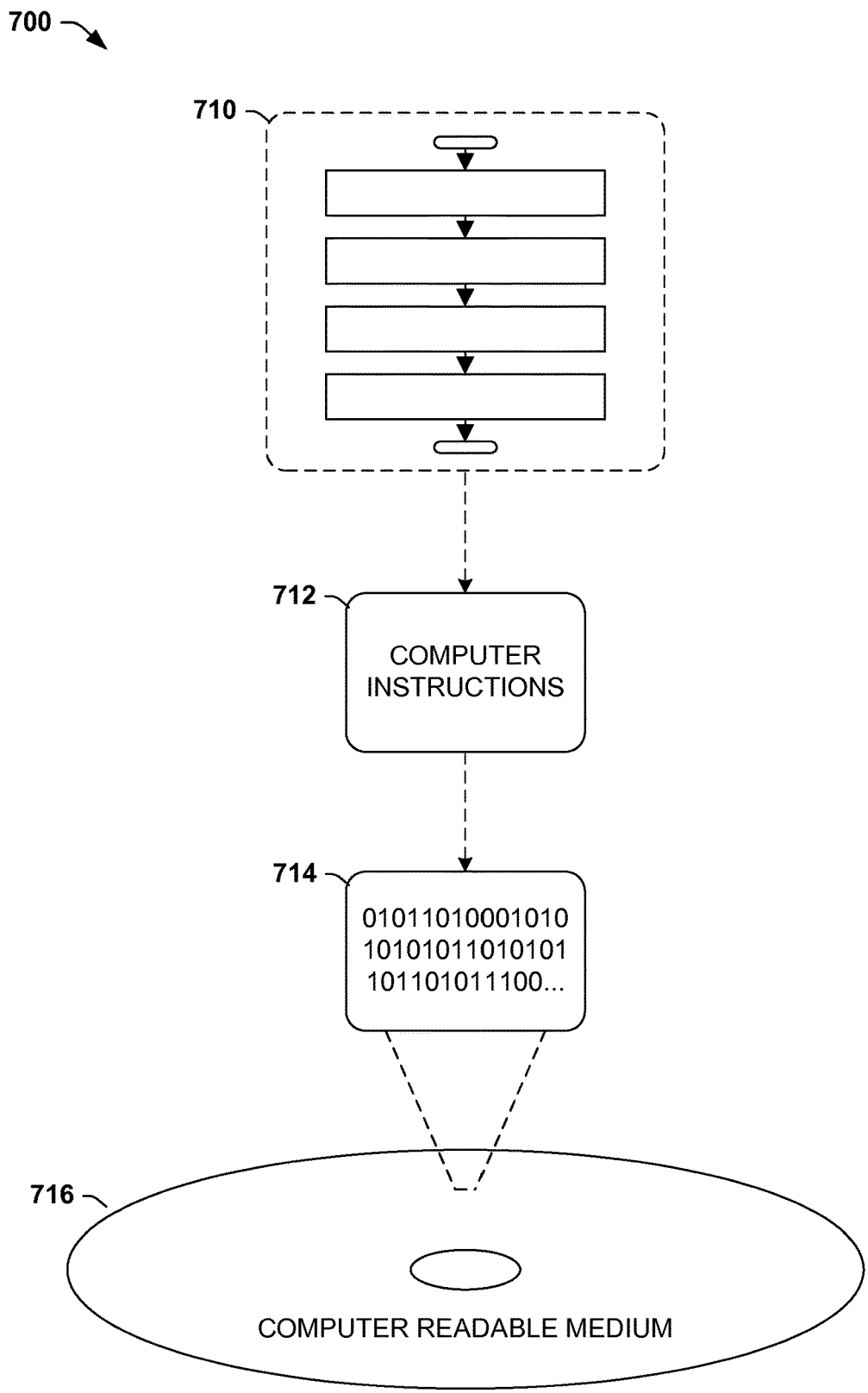
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as at least some of the exemplary method 100 of FIG. 1 and/or at least some of exemplary method 200 of FIG. 2, for example. In another such embodiment, the processor-executable instructions 712 may be configured to implement a system, such as, at least some of the exemplary system 300 of FIG. 3, at least some of the exemplary system 400 of FIG. 4, at least some of the exemplary system 500 of FIG. 5, and/or at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
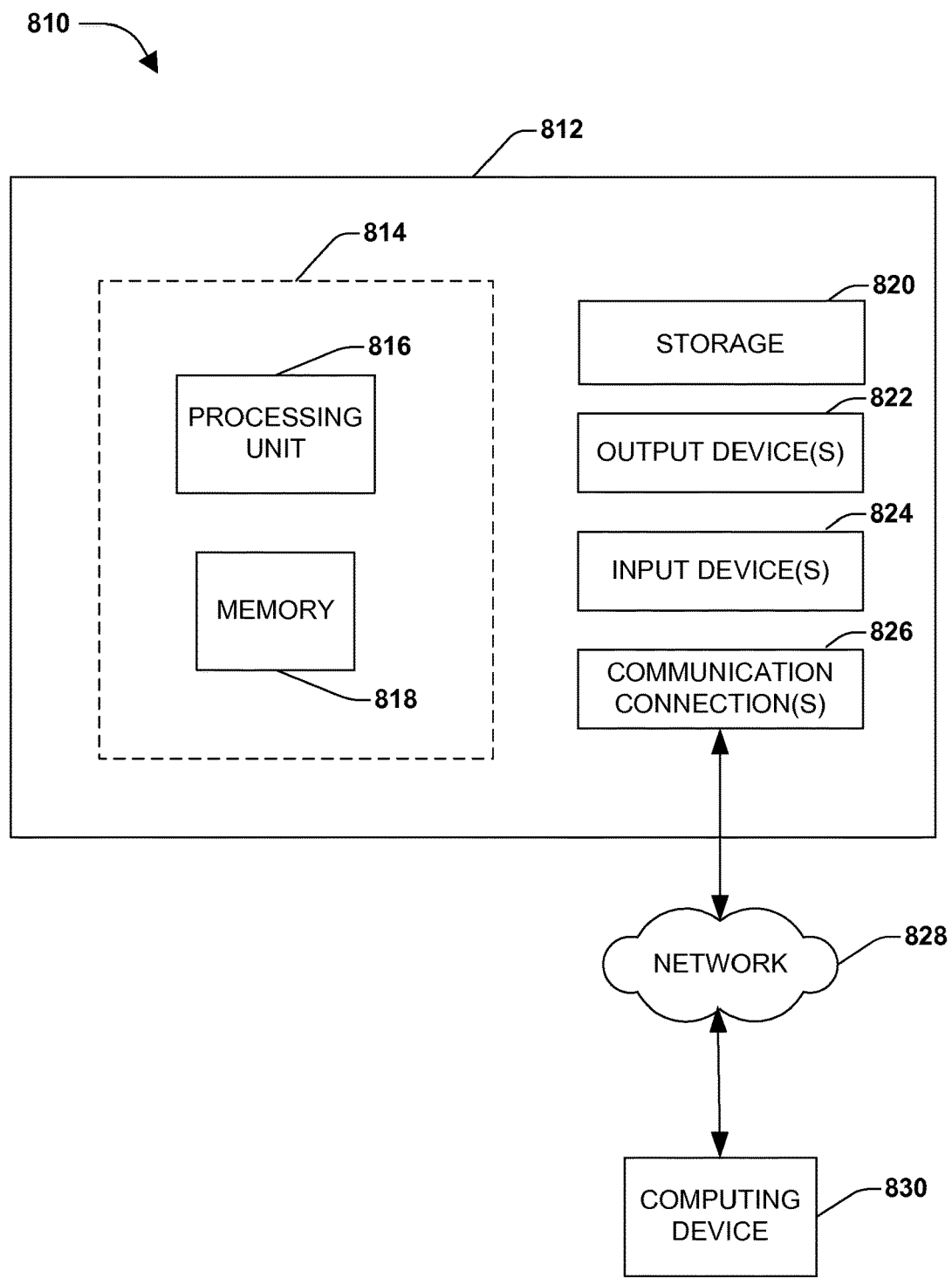
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer implemented system for location-aware content detection, the system comprising a processor and a memory, and further comprising:
　　an executable grouping component stored in the memory and, when executed on the processor, is configured to:
　　　　group a set of content into a plurality of content clusters;
　　　　identify a plurality of topics from the plurality of content clusters, wherein each identified topic is identified from content of any one content cluster of the plurality of content clusters; and
　　　　generate a plurality of topic clusters corresponding to the plurality of identified topics, wherein each topic cluster comprises at least some of the content of the corresponding content cluster from which the topic of the topic cluster was identified; and
　　an executable ranking component stored in the memory and, when executed on the processor, is configured to:
　　　　assign a local ranking to each topic of the plurality of topic clusters based upon an importance of the topic of the topic cluster to one or more users within a local region.

2. The system of claim 1 further comprising an executable presentation component stored in the memory and, when executed on the processor, is configured to:

present content of a topic cluster of the plurality of topic clusters to a user within the local region based upon the local ranking of the corresponding topic where the local ranking is above a local interest threshold.

3. The system of claim 1 wherein the executable ranking component is further configured to:

assign a second local ranking to each topic of the plurality of topic clusters based an importance of the topic of the topic cluster to one or more users within a local region one or more users within a second local region.

4. The system of claim 2 wherein the executable presentation component is further configured to:

identify that the user is within the local region based upon at least one of a cookie setting, a user profile, or an IP address.

5. The system of claim 2 wherein the executable ranking component is further configured to:

assign, for each topic of the plurality of topic clusters, a global ranking based upon an importance of the topic of the topic cluster on a global level.

6. A method for location-aware content detection, the method comprising:

grouping a set of content into a plurality of content clusters;

identifying a plurality of topics from the content clusters, wherein each identified topic is identified from content of any one content cluster of the plurality of content clusters;

generating a plurality of topic clusters corresponding to the plurality of identified topics, wherein each topic cluster comprises at least some of the content of the corresponding content cluster from which the topic of the topic cluster was identified;

for each topic cluster of the plurality of topic clusters:

assigning a global ranking to a topic of a topic cluster based upon an importance of the topic of the topic cluster on a global level; and assigning a local ranking to the topic of the topic cluster based upon an importance of the topic of the topic cluster of one or more users within a local region; and presenting selected content from the plurality of topic clusters to a user as a function of the global rankings and local rankings assigned to the plurality of topics, and as a function of a local region of the user.

7. The method of claim 6, the grouping of a set of content into a plurality of content clusters comprising:

grouping a first set of content and a second set of content into a first content cluster based upon a first feature common to content items of the first set of content, and a second feature common to content items of the second set of content.

8. The method of claim 6, the assigning of a global ranking to a topic of a topic cluster based upon an importance of the topic of the topic cluster on a global level comprising at least one of:

assigning the global ranking based upon a size feature associated with at least one of the topic cluster or content;

assigning the global ranking based upon a freshness feature associated with at least one of a creation time or a publication time of content;

assigning the global ranking based upon a source trust feature associated with a trust level for a source of content; or assigning the global ranking based upon a quality feature of content.

9. The method of claim 8, the quality feature of content corresponding to at least one of an image quality associated with the content, a user review for the content, a textual length of the content, or a source of the content.

10. The method of claim 6, the assigning of a local ranking to the topic of the topic cluster based upon an importance of the topic of the topic cluster of one or more users within a local region comprising:

deriving the local ranking based at least upon a content occurrence of content of the topic cluster with the local region of the user.

11. The method of claim 6, the assigning of a local ranking to the topic of the topic cluster based upon an importance of the topic of the topic cluster of one or more users within a local region comprising:

determining a number of user interactions with content of the topic cluster within a time span, a user interaction corresponding to at least one of a user viewing the content, a user commenting on the content, a user reviewing the content, or a user social media post referencing the content.

12. The method of claim 6, the assigning of a local ranking to the topic of the topic cluster based upon an importance of the topic of the topic cluster of one or more users within a local region comprising:

assigning a second local ranking to the topic of the topic cluster based upon user engagement data associated with content of the topic cluster by one or more users within a second local region, the second local ranking indicating that the topic has a higher interest rank to users within the second local region compared to users within the local region.

13. The method of claim 6, the presenting of selected content from the plurality of topic clusters to a user as a function of the global rankings and local rankings assigned to the plurality of topics, and as a function of a local region of the user comprising:

selecting content of a first topic cluster over content of a second topic cluster based upon a first topic being assigned a first local ranking that is higher than a second local ranking of a second topic; and displaying the selected content through at least one of a news application or a news website.

14. A computer-readable medium bearing computer-executable instructions that, when executed on a computer having at least a processor, carry out a method for location-aware content detection, the method comprising:

grouping a set of content into a plurality of content clusters;

identifying a plurality of topics from the content clusters, wherein each identified topic is identified from content of any one content cluster of the plurality of content clusters;

generating a plurality of topic clusters corresponding to the plurality of identified topics, wherein each topic cluster comprises at least some of the content of the corresponding content cluster from which the topic of the topic cluster was identified;

for each topic cluster of the plurality of topic clusters:

assigning a global ranking to a topic of a topic cluster based upon an importance of the topic of the topic cluster on a global level; and assigning a local ranking to the topic of the topic cluster based upon an importance of the topic of the topic cluster of one or more users within a local region; and presenting selected content from the plurality of topic clusters to a user as a function of the global rankings and local rankings assigned to the plurality of topics, and as a function of a local region of the user.

15. The computer-readable medium of claim 14, wherein grouping a set of content into a plurality of content clusters comprises:

grouping a first set of content and a second set of content into a first content cluster based upon a first feature common to content items of the first set of content, and a second feature common to content items of the second set of content.

16. The computer-readable medium of claim 14, wherein assigning a global ranking to a topic of a topic cluster based upon an importance of the topic of the topic cluster on a global level comprises at least one of:

assigning the global ranking based upon a size feature associated with at least one of the topic cluster or content;

assigning the global ranking based upon a freshness feature associated with at least one of a creation time or a publication time of content;

assigning the global ranking based upon a source trust feature associated with a trust level for a source of content; or assigning the global ranking based upon a quality feature of content.

17. The computer-readable medium of claim 14, wherein assigning a local ranking to the topic of the topic cluster based upon an importance of the topic of the topic cluster of one or more users within a local region comprises:

deriving the local ranking based at least upon a content occurrence of content of the topic cluster with the local region of the user.

18. The computer-readable medium of claim 14, wherein assigning a local ranking to the topic of the topic cluster based upon an importance of the topic of the topic cluster of one or more users within a local region comprises:

determining a number of user interactions with content of the topic cluster within a time span, a user interaction corresponding to at least one of a user viewing the content, a user commenting on the content, a user reviewing the content, or a user social media post referencing the content.

19. The computer-readable medium of claim 14, wherein assigning a local ranking to the topic of the topic cluster based upon an importance of the topic of the topic cluster of one or more users within a local region comprises:

assigning a second local ranking to the topic of the topic cluster based upon user engagement data associated with content of the topic cluster by one or more users within a second local region, the second local ranking indicating that the topic has a higher interest rank to users within the second local region compared to users within the local region.

20. The computer-readable medium of claim 6, wherein presenting selected content from the plurality of topic clusters to a user as a function of the global rankings and local rankings assigned to the plurality of topics, and as a function of a local region of the user comprises:

selecting content of a first topic cluster over content of a second topic cluster based upon a first topic being assigned a first local ranking that is higher than a second local ranking of a second topic; and displaying the selected content through at least one of a news application or a news website.

* * * * *